(12) United States Patent
Tolron et al.

(10) Patent No.: US 12,367,567 B2
(45) Date of Patent: Jul. 22, 2025

(54) METHOD AND DEVICE FOR ON-SITE EVALUATING QUALITY OF AN IMAGE

(71) Applicant: Ventus Engineering GmbH, Vienna (AT)

(72) Inventors: Xavier Tolron, Vienna (AT); Shavkat Mingaliev, Vienna (AT); Poul Anker Skaarup Lübker, Baar (CH)

(73) Assignee: Ventus Engineering GmbH, Vienna (AT)

( * ) Notice: Subject to any disclaimer, the term of this patent is extended or adjusted under 35 U.S.C. 154(b) by 87 days.

(21) Appl. No.: 18/288,306

(22) PCT Filed: Apr. 25, 2022

(86) PCT No.: PCT/EP2022/060865
§ 371 (c)(1),
(2) Date: Oct. 25, 2023

(87) PCT Pub. No.: WO2022/229082
PCT Pub. Date: Nov. 3, 2022

(65) Prior Publication Data
US 2024/0202894 A1     Jun. 20, 2024

(30) Foreign Application Priority Data
Apr. 26, 2021   (EP) .................................... 21170482

(51) Int. Cl.
*H04N 7/18*       (2006.01)
*G06T 7/00*       (2017.01)
(Continued)

(52) U.S. Cl.
CPC .............. *G06T 7/0002* (2013.01); *G06T 7/12* (2017.01); *H04N 7/183* (2013.01); *H04N 23/66* (2023.01);
(Continued)

(58) Field of Classification Search
CPC ...... H04N 23/66; H04N 7/183; G06T 7/0002; G06T 7/12; G06T 2207/10032; G06T 2207/20021; G06T 2207/30168
(Continued)

(56) References Cited

U.S. PATENT DOCUMENTS 7,711,210 B2 * 5/2010 Hosoda .................. G06V 20/47
                                                                        382/305
9,330,449 B2 * 5/2016 Newman ................. F03D 17/00
(Continued)

FOREIGN PATENT DOCUMENTS

WO         2021008912 A1      1/2021

OTHER PUBLICATIONS

Lim Suk Hwan et al: "Automatic focus quality analysis for managing large collection of digital photographs", Proceedings of SPIE, vol. 6015, Oct. 23, 2005 (Oct. 23, 2005), pp. 601510-601510-8, XP055848253, 1000 20th St. Bellingham WA 98225-6705 USA, ISSN: 0277-786X, DOI: 10.1117/12.637227 ISBN: 978-1-5106-4548-6, abstract, pp. 1-4,6,8.
(Continued)

*Primary Examiner* — Trang U Tran
(74) *Attorney, Agent, or Firm* — Dykema Gossett PLLC

(57) ABSTRACT

A method for on-site evaluating quality of an image of a part of a structure, optionally a part of a wind turbine generator, the method comprising acts of: —receiving an image from a visual inspection system with a field of view about a line of sight towards the part of the structure; —dividing the image into sub-images; —calculating edge scores of the sub-images; —sorting the sub-images into a top sub-group having an edge-score above a pre-set edge score and a bottom sub-group having an edge-score below the pre-set edge score; —evaluating the quality of the image as a function of coordinates of the top sub-group.

13 Claims, 7 Drawing Sheets

(51) Int. Cl.
*G06T 7/12* (2017.01)
*H04N 23/66* (2023.01)

(52) U.S. Cl.
CPC ............... *G06T 2207/10032* (2013.01); *G06T 2207/20021* (2013.01); *G06T 2207/30168* (2013.01)

(58) Field of Classification Search
USPC ........................................................ 348/144
See application file for complete search history.

(56) References Cited

U.S. PATENT DOCUMENTS

| | | | | |
|---|---|---|---|---|
| 9,652,839 | B2* | 5/2017 | Newman | G06T 7/0004 |
| 10,290,148 | B2* | 5/2019 | Ashdown | H05B 47/16 |
| 10,600,194 | B2* | 3/2020 | Chang | G01C 11/02 |
| 11,598,871 | B2* | 3/2023 | Stokes | G06T 15/08 |
| 2019/0066317 | A1* | 2/2019 | Chang | G05D 1/0094 |
| 2019/0094149 | A1* | 3/2019 | Troy | G01S 17/933 |
| 2022/0172464 | A1* | 6/2022 | Ross | G05D 1/0044 |
| 2022/0392211 | A1* | 12/2022 | Johnson | G06V 10/26 |

OTHER PUBLICATIONS

Bansal Raghav et a.: "Blur image detection using Laplacian operator and Open-CV", 2016 International Conference System Modeling & Advancement in Research Trends (SMART), IEEE, Nov. 25, 2016 (Nov. 25, 2016), pp. 63-67, XP033084795, DOI: 10.1109/SYSMART.2016.7894491, abstract.

Anonymous: "Effect of switching response and explanatory variable in simple linear regression—Cross Validated", Nov. 13, 2020 (Nov. 13, 2020), pp. 1-11, XP055848549, Retrieved from the Internet: URL:https://web.archive.org/web/20201113145248/https://stats.stackexchange.com/questions/20553/effect-of-switching-response-and-explanatory-variable-in-simple-linear-regressio [retrieved on Oct. 6, 2021], the whole document.

* cited by examiner

A:

B:

C:

D:

A:

B:

C:

D:

A:

B:

C:

A:

B:

C:

METHOD AND DEVICE FOR ON-SITE EVALUATING QUALITY OF AN IMAGE

CROSS-REFERENCE TO RELATED APPLICATION

This application is a national stage filing based upon International application No. PCT/EP2022/060865, filed 25 Apr. 2022, which claims the benefit of priority to Europe application Ser. No. 21/170,482.0, filed 26 Apr. 2021.

FIELD OF THE INVENTION

The present invention relates to a method and a device for on-site evaluating quality of an image of a part of a structure, optionally a part of a wind turbine generator. The image must have a quality enabling inspection of a structure such as inspection of a blade of a wind turbine generator for inspection of damage. The damage may be surface damage or structural damage.

BACKGROUND OF THE INVENTION

Visual inspection of structures is an ever-growing field. The inspection must be carried out at the structure which may be positioned on land or offshore.

In most situations, the visual inspection collects data by taking images including pictures and videos of the structure, and the collected data are then evaluated later. This is due to high running cost of the inspection. However, this also increases the risk of finding out at a later stage that the collected data being insufficient, and thereby one would require a repeat of the visual inspection, which is expensive and time consuming, especially in case of an offshore structure. As an example, visual inspection of a wind turbine generator park requires thousands of images to be able to properly inspect each wind turbine generator as large number of images must be taken from all sides i.e. pressure side, suction side, leading edge, and trailing edge for each blade.

Thus, there is a need for a method for on-site evaluating the quality of the images captured during inspection of a part of a structure, thereby enabling a decision maker to deem images acceptable or to retake images of part of the structure being inspected.

OBJECT OF THE INVENTION

It is an object of the invention to provide a method and a device for on-site evaluating quality of an image of a part of a structure, optionally a part of a wind turbine generator.

DESCRIPTION OF THE INVENTION

An object of the invention is achieved by a method for on-site evaluating quality of an image of a part of a structure, optionally a part of a wind turbine generator.

The method comprising acts of:
receiving an image from a visual inspection system with a field of view about a line of sight towards the part of the structure;
dividing the image into sub-images;
calculating edge score of the sub-images;
sorting the sub-images into a top sub-group having an edge-score above a pre-set edge score and a bottom sub-group having an edge-score below the pre-set edge score;
evaluating quality of the image as a function of coordinates of the top sub-group.

The quality of the image is evaluated based on whether a clear edge can be detected in the image. In the case of a wind turbine generator, the blade or the tower should clearly divide or partly divide the image. However, if the image is out of focus then there will not be a clear division caused by the blade or tower, i.e. the image is out of focus and thus of low quality. The same will be the case for a structure such as a bridge pylon or other bridge parts. Thus, the method is for evaluating if coned-shaped objects images are in-focus, wherein the method evaluate whether the coned-shaped objects are in focus as a function of coordinates of the top sub-group.

The quality of the image is acceptable if the part of the structure is in-focus allowing to inspect the surface of the part and estimate damages and need to repair. The quality of the image is non-acceptable if the part of the structure is out of focus since it would not be possible to properly identify the surface of the part. Thus, it will not be possible to estimate the damages and need for repair.

If the image is out of focus, then coordinates of the top sub-group will be scattered across the image at random or near random. The quality can then be evaluated by evaluating the variance of the top sub-group coordinates along the first and second axis.

If the ratio of variance between the first and second axis is above or below pre-set values, then the image will be evaluated as an acceptable image. The images FIG. 4A-C have a high ratio for (second axis variance)/(first axis variance), while FIG. 4D have a low ratio for (second axis variance)/(first axis variance). This evaluation will however cause images of the part of the structure, wherein the part extends at 45 degrees relative to the cross point of the axis.

The act of evaluating can be performed by rotating the image relative to a stationary first and second axis, if variance along the first and second axis of the top sub-group changes with rotation, then the image is acceptable.

The visual inspection system should be interpreted broadly as the method is independent of the visual inspection system capturing the image, thus the visual inspection system may be camera or a high speed camera positioned on a vessel or on an unmanned aerial vehicle (UAV) or ground vehicle or camera pod or by other means.

The pre-set edge score may be a single fixed value or be a value set as function relative to the edge-score of the entire image or be adaptable value such as a score allowing top 10% values to be part of the top sub-group.

The act of dividing may include an act of resizing the images into a squared image dim×dim having the same dimensions along both first and second axis, such as 1000× 1000 pixels, then if every sub-image is defined with a dimension of 20 pixels, that is a total of 2500 sub regions of the image.

The method may include of changing the colouring of the image into grayscale. The grayscale simplifies computation power needed for the edge score since each pixel is only different levels of grey.

In an aspect, the structure may be a wind turbine generator (WTG).

The part of the wind turbine generator may be part of a blade or part of the tower as it is not possible to evaluate the entire structure in a single image.

Furthermore, the image may be of the pressure side, the suction side, the leading edge, or the trailing edge for the blade.

A wind turbine generator is an example of a structure which are difficult to capture in an image where the image has a sufficiently high quality allowing the image to be used for inspection. This is in part due to a wind turbine generator being white, thus it is difficult to achieve correct focus, and if inspection is performed while the WTG is operating then the tip of the blade is moving at a speed of above 200 km/h such as above 300 km/h.

WO 2021 008912 A1 describes a visual inspection system which has a fixed focus and a lidar is used for positioning and triggering the visual inspection system correctly relative to parts of the wind turbine generator. However, even in this case when taking thousands of images, there will be images that are of too low a quality. Thus, the solution described in WO 2021 008912 A1 can be improved further by the method according to the invention. Because the invention which will make sure that specifically captured images in too low quality (non-acceptable group) can be retaken immediately while the visual inspection system is still on site.

In an aspect, the act of calculating edge scores may be performed by computing the Laplacian of the sub-images and extracting the variance of each sub-image as the edge score.

A high variance indicates a high sharpness or low blurriness of the sub-image. Thus the sub-image is not blurry or at least less blurry compared to a sub-image having a lower sharpness.

Blur and sharpness may be used interchangeably as the terms are antonyms for evaluating an image.

In an aspect, the method may comprise further acts of
calculating a first linear regression of the top group and second linear regression of the top group, where the second linear regression has reversed the first and second axis relative to the first linear regression;
evaluating quality of the image as a function of a regression angle between the first and second linear regression.

The computation of two linear regressions is fast and simple and allows for a simple evaluation being the regression angle between the first and second regression. The angle will be between 0 and 90 degrees.

The act of evaluation is thereby reduced to a simple comparison between the regression angle between the first and second regression and a pre-set angle. If the regression angle is less than the pre-set angle, then the quality of the image is acceptable.

A pre-set angle of 20 degrees has in tests shown good results. However, other values of the pre-set angle may be used such as 5, 10, 15, 25 or 30 degrees. A small value will increase the strictness of the method.

Tests have shown that the evaluation using two linear regressions is more stable if the image is squared, i.e. the length is equal to the width. Thus, the act of dividing may include an act of resizing the images into a squared image dim×dim having the same dimension along both first and second axis.

FIG. 4A-D shows different examples wherein the regression angle is less than 20 degrees, and all images are evaluated, and the quality of the image is acceptable.

In an aspect, the method may comprise further acts of
calculating a mean coordinate is performed on the top sub-group; and
evaluating quality of the image as a function of the mean coordinate relative to pre-set threshold border within the image.

The calculation of the mean coordinate is made to evaluate whether the part of the structure is within the image. If the part of the structure, such as a wind turbine blade, is not sufficient within the image, then it may not be possible to identify structural damages.

Surprisingly, it has proven that the calculation of the mean coordinate is also useful for identifying false positives of the act of evaluation as a function of the regression angle between the first and second linear regression, see FIG. 6C. The image of FIG. 6C would be evaluated to have an acceptable quality of the image due to bushes in the lower part of the image even though the wind turbine blade is out of focus.

The mean coordinate is shown in the figures as a filled white square.

The pre-set threshold border is centred in the image and it may have dimensions being 10-25% or 15-20% smaller than the dimensions of the image.

As an example, for an image having 1000×1000 pixels the pre-set threshold border may be a square having 850×850 pixels, wherein the quality of the image is evaluated as non-acceptable if the mean coordinate is outside the pre-set threshold border.

In an aspect, the method may be performed on a group of images, and an act of sorting the group of images is performed as a function of quality into at least two groups
an accepted image group; and
a non-accepted image group.

The group of images may be a single image or a plurality of images such as 10, 100, 1.000 or 10.000 or more.

The images in the accepted image group are deemed to be acceptable and no further review is necessary for evaluating the quality of image. The images may later be used for inspecting damages to the part of the structure.

The images sorted into the non-accepted image group may be discarded.

The images sorted into the non-accepted image group may be set for further review, wherein a decision maker will further evaluate the images in the non-accepted image group. The decision maker may decide to move the non-accepted image to the accepted image group.

FIGS. 5A-D are examples of false negatives, which a decision maker will move from the non-accepted image group to the accepted image group.

The decision maker may be computer-implemented performing further acts of evaluating on the non-accepted image group. The acts of evaluating may include machine-learning or supervised algorithms.

The decision maker may be an operator performing an act of evaluating the non-accepted images on a user interface. An operator would easily be able to identify that FIGS. 5A-D are all acceptable.

There may be further groups such as
accepted image group after review;
non-accepted image group—[not sharp; not centred]
non-accepted image group—[sharp; not centred]
non-accepted image group—[not sharp; centred]

The above-mentioned groups may be further divided according to the part of structure, which is the focus of the image, such as
Wind turbine generator I, Blade A, leading edge, tip
Wind turbine generator I, Blade B, leading edge, tip
. . .
Wind turbine generator X, tower X This also enables to have dynamic pre-set values according to which parts of the structure the image is being taken from.

The tip of a wind turbine blade is more difficult to evaluate as it will end mid picture, contrary to the centre of the blade which will divide the image. Thus, this further division will also enable a decision maker to better evaluate which group of images that must be checked.

In an aspect, the method may comprise further acts of
geotagging the image as a function of position and line of sight of the visual inspection system.

The data related to position and line of sight can be used to determine which wind turbine generator is being recorded, and it will likewise be possible to further determine which side of the part of the structure is being recorded based on the geotag data.

For a blade of a WTG it will be possible to determine whether the image is of the pressure side, the suction side, the leading edge, or the trailing edge.

The geotagging may use positioning coordinates from on a global positioning system such as GPS.

The geotagging may use a local positioning system. This may be used in combination with a global positioning system.

In an aspect, the method comprises further acts of
sending to the visual inspection system instructions, which instructions causes the visual inspection system to recapture at least one image having an unaccepted quality at a perturbed position and/or perturbed line of sight as a function of the geotag,
repeating the method as previously described.

If the image of the part of structure is not sharp, then this will often be due to a wrong positioning of the visual inspection system relative to the part. This is especially the case when capturing images of a wind turbine generator blade, since wind turbine generator blades normally are white, then it is difficult to autofocus on the parts of the wind turbine generator. It is even more difficult if inspection is performed while the WTG is operating then the tip of a blade may rotate with a speed above 200 km/h.

This can be solved by using a fixed focus. However, if the position of the visual inspection system is wrong relative part of the structure then the image of the part will be out of focus and it will not be possible to identify damages.

Thus, the act of recapturing at least one image at perturbed position and/or perturbed line of sight may cause the image to be accepted as the part is in focus.

In an aspect, the method may comprise a further act of warning a decision maker as a function of the quality of an image and/or as function of the non-accepted image group relative to the accepted image group.

The warning enables the decision maker to decide whether to recapture the non-accepted image or group of images in the non-accepted image group. The function of the non-accepted image group relative to the accepted image group may be a pre-set value, such as it is acceptable if 1% or 5% or 10% of the images taken is sorted in the non-accepted group as the images may be have overlapping parts of the structure.

Thereby, decisions can be made on-site. This will reduce the total operation costs and reduce time needed to inspect structures, since the risk of capturing images of low quality is reduced significantly.

Decision maker may be an operator or machine or a computer-implemented decision maker.

In an aspect, the visual inspection system may have a fixed focus. The part of the structure on the images will be blurry if the image is captured when the distance to the part of the structure is not correct.

An object of the invention is achieved by a device for on-site evaluating an image of a part of a structure, optionally a part of a wind turbine generator. The device is in communication with a visual inspection system with a field of view about a line of sight towards the wind turbine generator (WTG) and the device comprises the means for carrying out the method for on-site evaluating quality of an image of a part of a structure.

The device may be on-site allowing direct communication with visual inspection system.

The device may be off-site. As an example, the device for evaluation could be placed in an office in communication with the visual inspection system. This will still be regarded as being performed on-site, since the visual inspection system is on-site and results from the device is used on-site to base decisions.

In an aspect, the device may further comprise
a display for manual evaluating images in the non-accepted image group.

This allows a decision maker to manually evaluate the images in the non-accepted image group. The decision maker may be the operator if the device is on-site.

In other cases, the decision maker may be a person or group of persons in an off-side office evaluating the images on one or more displays. FIG. 5A-D are examples of images sorted to the non-accepted image group, which a human decision maker would deem to be acceptable.

In an aspect, the device is an unmanned aerial vehicle carrying the visual inspection system.

The device may after each capture of an image or after capture of a group of images evaluate whether the image or images have an acceptable image quality.

In the cases, where the image is geotagged, then the device may recapture the image at a perturbed positioned relative to the initial position or at a perturbed line of sight relative to the initial line of sight. Thereby the next capture image may have an acceptable image quality where the part of the structure is in focus.

This is particularly useful when the visual inspection system has a fixed focus.

A computer program comprising instructions which, when the program is executed by a computer, cause the computer to carry out the method.

A computer-readable data carrier having stored there on the computer program.

A method of cropping of in-focus image of a part of a wind turbine generator. The method comprising acts of:
flying an unmanned airborne vehicle carrying a visual inspection system in a position in the vicinity of the wind turbine generator;
pointing the visual inspection system with a field of view about a line of sight towards the wind turbine generator;
capturing of an image of the field of view using the visual inspection system;
dividing the image in sub-images;
assigning an in-focus-score to each sub-image;
detecting in-focus sub-images as a function of the in-focus-score;
cropping an in-focus image of the part based on detected in-focus sub-images.

Thereby, the unmanned airborne vehicle (UAV) is able to capture an image of the part of the wind turbine generator, while removing any unnecessary data such as at least parts of the region of non-interest (RONI) in FIG. 2B. This will reduce the needed storage space significantly and in some cases by a factor of 30-50%.

In an aspect, the in-focus-score may be an edge score as previously described. The act of assigning may be performed by computing the Laplacian of the sub-images and extracting the variance of each sub-image as the in-focus-score.

In an aspect, the act of flying may be performed along a flight-path and includes an act positioning the unmanned airborne vehicle (UAV) a function of the in-focus score of the in-focus image from a previous position along the flight-path.

In an aspect, the method of cropping of in-focus image of a part of a wind turbine generator may be repeated until the act of capturing are performed to provide an in-focus image of the part of the wind turbine generator.

Thereby the method ensures a complete visual inspection of the part such as the blade of a wind turbine generator without or with little human intervention. Furthermore, the background of each image is limited due to cropping of the image data.

In an aspect, the method may further comprise an act of triggering the act of capturing as a function of a moving part of the wind turbine generator. The act of triggering may be performed by a lidar measuring the distance to the wind turbine generator and the moving part will cause a sudden change in distance. The change in distance will cause the triggering.

In an aspect, there may be a further act of establishing relative position or distance between the unmanned airborne vehicle (UAV) and the wind turbine generator. The act of establishing may be performed by a LIDAR carried by the unmanned airborne vehicle (UAV).

In an aspect, the captured images are time stamped with a clock synchronized with a wind turbine operational clock. This will make it simpler to compare image taking during different inspections i.e. an inspection may be performed each year or at other time intervals.

In an aspect, the method may further comprise acts of
selecting at least one reference image;
comparing the at least one in-focus image with the at least one reference image; and
diagnosing structural aspects of the wind turbine generator (WTG) as a function of the result of the act of comparing.

The reference image may be image captured during an earlier inspection such as the last inspection which enable diagnosing by detecting changes.

An unmanned airborne vehicle (UAV) may be configured with means to perform one or more of the methods of cropping of in-focus image of a part of a wind turbine generator.

DESCRIPTION OF THE DRAWING

Embodiments of the invention will be described in the figures, whereon.

DETAILED DESCRIPTION OF THE INVENTION

| Item | Reference |
|---|---|
| Region of interest | ROI |
| Region of non-interest | RONI |
| Visual inspection system | 10 |
| Camera | 11 |
| Field of view | 12 |
| Line of sight | 14 |
| Device | 20 |
| Wind turbine generator | WTG, 30 |
| Part | 34 |
| Wind turbine tower | 46 |
| Nacelle | 48 |
| Rotor blade | 50 |
| Rotor | 51 |
| Rotation direction | 59 |
| Unmanned airborne vehicle | UAV |
| Flight path | 86 |
| Inspection path | 88 |
| Image | 90 |
| Sub-images | 92 |
| Top sub-group | 93 |
| Bottom sub-group | 94 |
| Linear regression | 95I, 95II |
| Regression angle | 96 |
| Mean coordinate | 97 |
| Pre-set threshold border | 98 |
| Method for on-site evaluating quality of an image | 1000 |
| receiving | 100 |
| Dividing | 200 |
| Calculating | 300 |
| Sorting | 400 |
| Evaluating | 500 |
| Geotagging | 600 |
| Sending | 700 |

Figure 1:
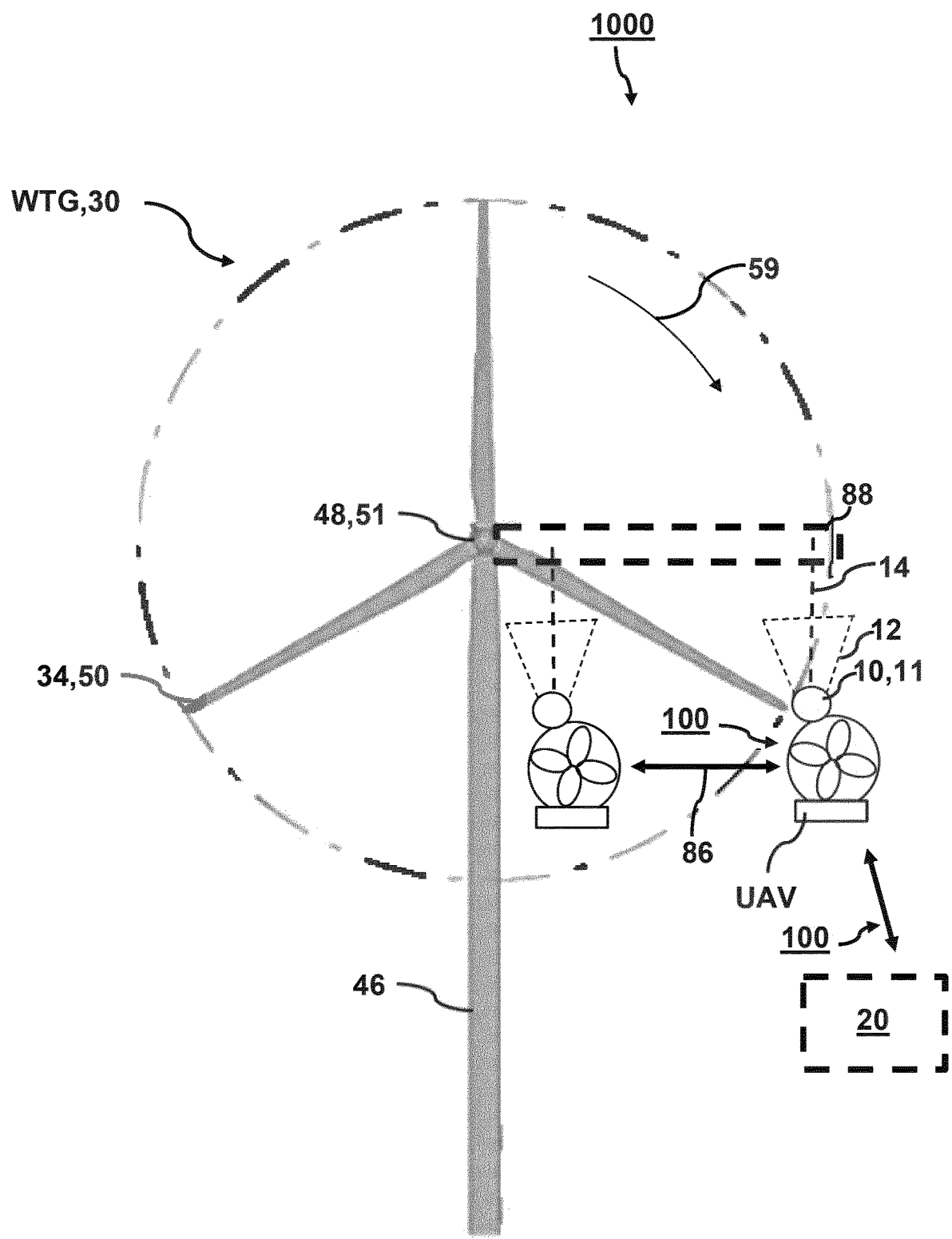
FIG. 1 illustrates a wind turbine generator being visually inspected by a UAV.

FIG. 1 illustrates a wind turbine generator WTG, 30 being visually inspected by an unmanned airborne vehicle (UAV).

The UAV carriers a visual inspection system 10. The visual inspection system 10 includes a camera 11 which has a field of view 12 along a line of sight 14 for capturing images 90 of the parts 34 of the WTG. In the present example the visual inspection system 10 is capturing images 90 of the rotor blades 50, however other parts 34 of WTG could be inspected such as the tower 46, the nacelle 48 or the rotor 51.

In the present figure, the blades 50 rotate in the shown direction 59. Thereby, the UAV can inspect the blades 50 by moving along a flight path 86 and thereby inspect along the inspection path 88 while capturing images of all three blades at different distances from the rotor 51.

The captured images 90 are sent to a device 20 which perform an act of receiving at least one image 90 from the visual inspection system 10. The device 20 may be placed on UAV or it may be placed in a nearby vessel or vehicle or off site in an office. the position of the device 20 is not important along as the device 20 can receive images 90 while the visual inspection system 10 is on site as this enables the visual inspection system 10 to recapture images.

The first step of the method 1000 for on-site evaluating quality of an image 90 is performed by receiving at least one image 90 from the visual inspection system 10.

The visual inspection system 10 could in other embodiments be positioned on a tripod or a vessel or a vehicle. The device 20 may in these cases be placed on the tripod, vessel or vehicle or be placed off-site.

Figure 2:
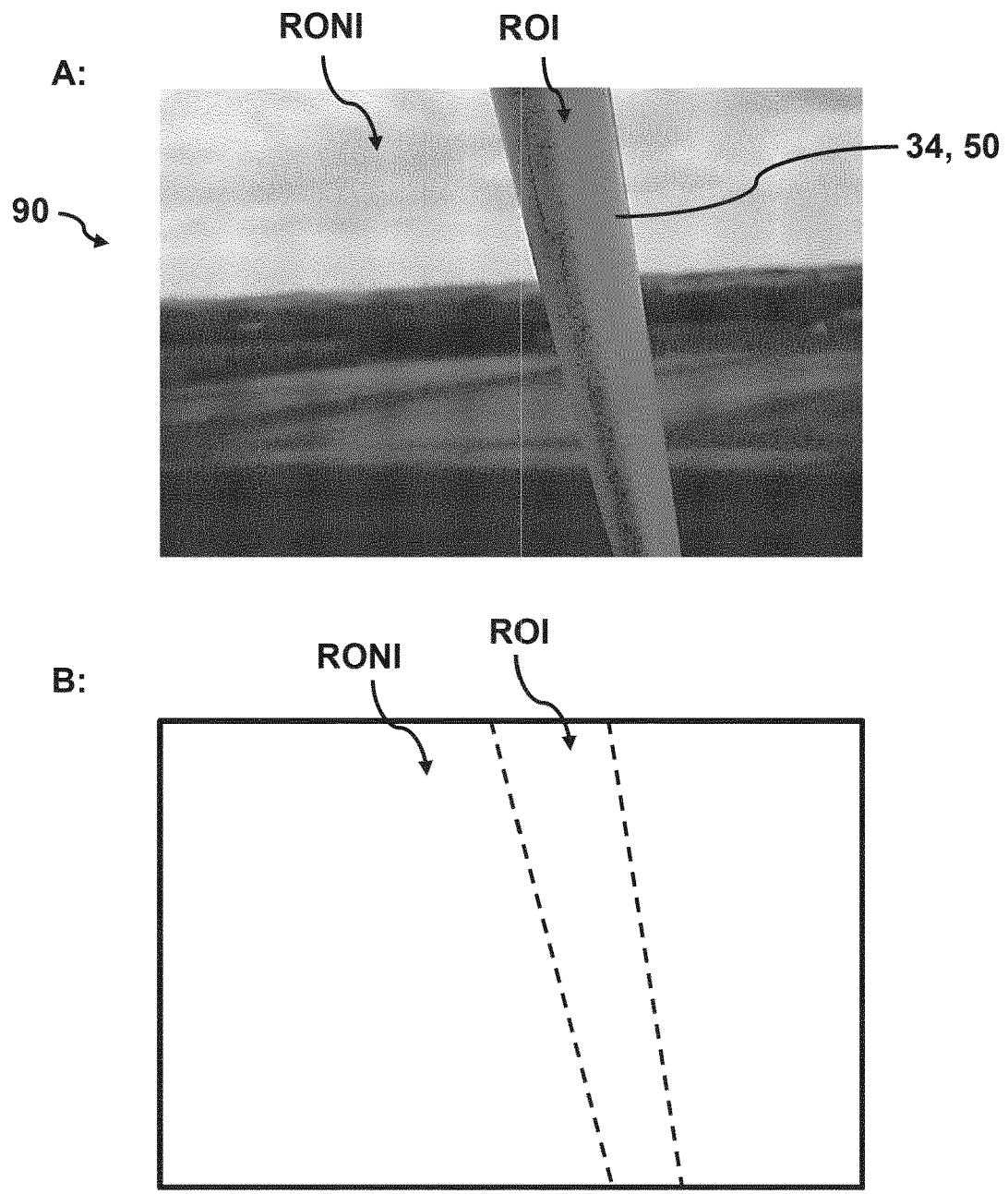
FIG. 2 illustrates an image of a part of a wind turbine generator (A) and illustration of the region of interest of the image.

FIG. 2 illustrates an image of a part 34 of a wind turbine generator WTG and illustration of the region of interest ROI of the image 90.

FIG. 2A shows a capture in image of part of a blade 50 of a WTG. The image 90 was captured by a UAV with a visual inspection system 10. The image 90 has the blade 50 in-focus and this enables inspection of the blade 50 as surface structure can be identified. The blade 50 is the ROI and if the ROI is blurry due to a misalignment of the visual inspection system 10 focus relative to the distance blade 50, then it would not be possible to inspect the surface structure and thus the image 90 would have an non-acceptable quality.

The background is a region of non-interest RONI and could in theory be removed without affecting the quality of the image.

FIG. 2B illustrates the purpose of the method 1000 for on-site evaluating quality of an image 90. The method must be able to identify whether the ROI is in-focus i.e. have sufficient sharpness such that the surface structure can be inspected.

If the ROI is in-focus, then the image 90 has an acceptable quality.

If the ROI is out of focus, then the image 90 has a non-acceptable quality.

The acts of the method are described in greater details in the following figures.

Figure 3:
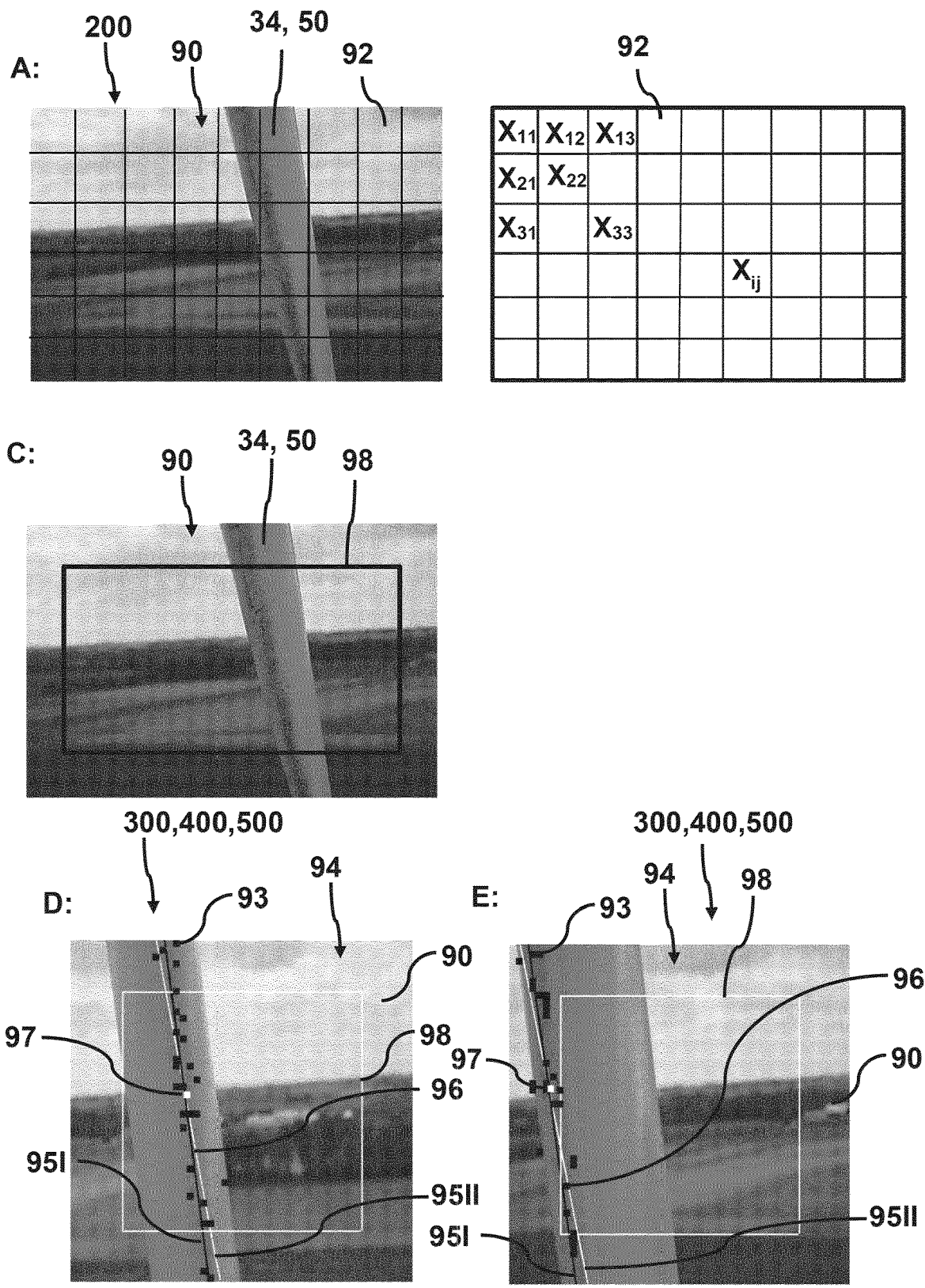
FIG. 3 illustrates two parameters for evaluating quality of an image.

FIG. 3 illustrates two parameters for evaluating quality of an image 90.

FIG. 3A illustrates the act of dividing 200 the image 90 into sub-images 92. For illustration purposes the image 90 is dividing into 56 sub-images 92, when in practice a 1000× 1000 pixel may be divided into 2500 sub-images 92.

There may be an act of changing the image 90 to greyscale.

An act of calculating 300 edge scores ($X_{ij}$) of the sub-images 92 is then performed.

The act of calculating 300 edge scores may be by computing the Laplacian of the sub-images 92 and extracting the variance of each sub-image 92 as the edge score. A sub-image 92 where the pixels across the sub-image 92 go from white to black in a few pixels will have a high variance and thus a high edge score. In the shown image 90 the surface of the blade 50 has dark/black areas which would cause a high variance.

There may also be an act of calculating 300 an edge score on the image 90 by computing the Laplacian of the images 90 and extracting the variance of the image 90 as the edge score.

This is followed by an act of sorting 400 the sub-images 92 into a top sub-group 93 having an edge-score above a pre-set edge score and a bottom sub-group 94 having an edge-score below the pre-set edge score. This is shown in FIGS. 3D and 3E, where the top sub-group 93 is marked as a black box, while the bottom sub-group 94 is all other sub-images 92 that are not marked. The black boxes are larger than the actual sub-images 92 for illustration purposes. In this case the top sub-group 93 is the sub-images 92 having the 10% highest variance/edge score.

A further act of calculating 300 a first linear regression 95I of the top sub-group 93 and second linear regression 95II of the top sub-group 93 is performed, where the second linear regression 95II has reversed the first and second axis relative to the first linear regression 95I.

Followed by an act of evaluating 500 the quality of the image as a function of a regression angle 96 between the first and second linear regression 95I, 95II. Depending on the regression angle 96 value, then the quality of image 90 may be deemed acceptable or non-acceptable. In these two cases the quality of image 90 is acceptable if the regression angle 96 is below 20 degrees and both images 90 pass the regression angle 96 test.

FIG. 3C illustrates another parameter for evaluation whether the image 90 has a quality which is acceptable. A pre-set threshold border 98 is used to determine whether the part 34 of the structure is within the image 90 or not. The pre-set threshold border 98 is also shown in FIGS. 3D and 3E as the white box.

An act of calculating 300 a mean coordinate 97 is performed on the top sub-group 93. Followed by evaluating 500 quality of the image as a function of the mean coordinate 93 relative to pre-set threshold border 98 within the image 90. If the mean coordinate 97 is within the pre-set threshold border 98, then the image 90 is centred and the image has an acceptable quality, and if the mean coordinate 97 is outside the pre-set threshold border 98, then the image 90 is not centred, and the image 90 has a non-accepted quality according to the method 1000.

In FIG. 3D, the image would be deemed to be centred as the mean coordinate 97 is within the pre-set threshold border 98.

In FIG. 3E, the image would be deemed to be not centred as the mean coordinate 97 is within the pre-set threshold border 98. Thus, the image 90 in FIG. 3E would be evaluated as non-accepted by the method.

In the present case a decision maker such as an operator may inspect the image 97 and deem that the image 90 has an acceptable quality. However, in other cases such as FIG. 6C the image 90 is correctly evaluated to have a non-acceptable quality.

Figure 4:
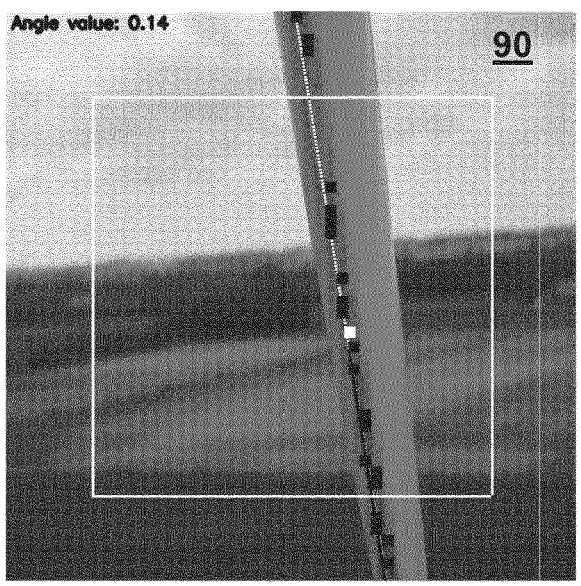
FIG. 4 illustrates four images which are deemed by the method to have an acceptable quality.
Figure 4:
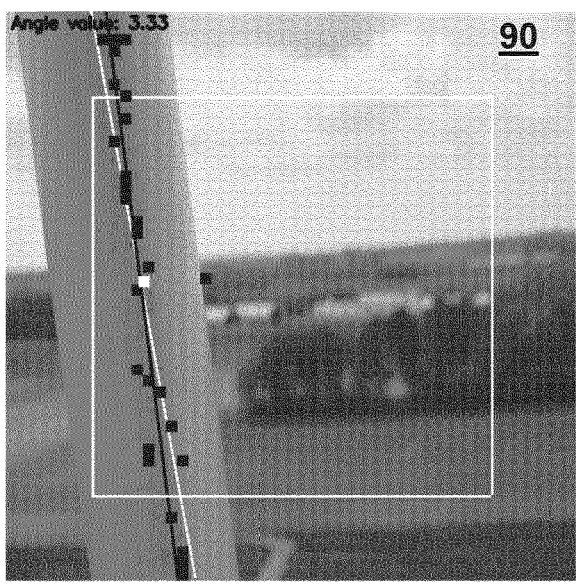
Figure 4:
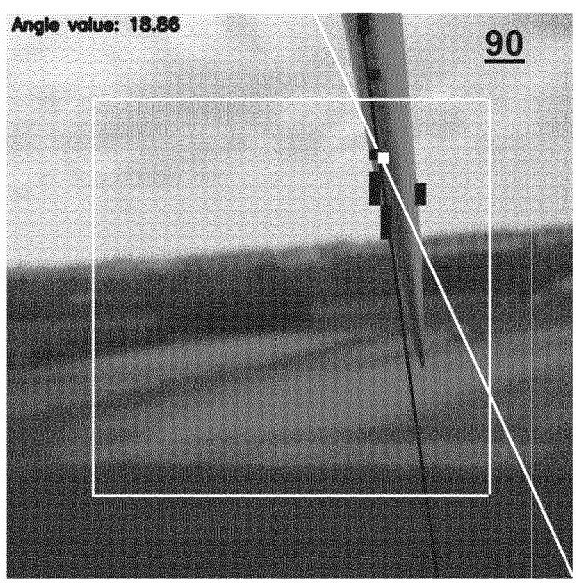
Figure 4:
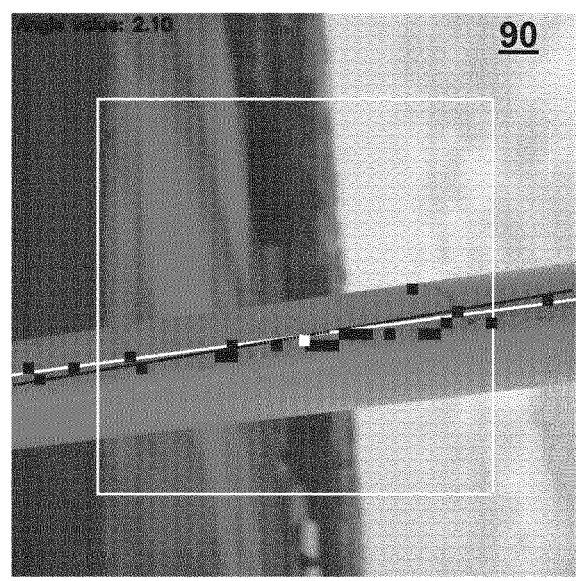

FIG. 4 illustrates four images 90 which are deemed by the method 1000 to have an acceptable quality.

The threshold angle was in these evaluations 20 degrees, however other values can be used.

In FIG. 4A the image 90 is centred, and the regression angle 96 is 0.14. Thus, the image 90 is evaluated as having an acceptable quality.

In FIG. 4B the image 90 is centred, and the regression angle 96 is 3.33. Thus, the image 90 is evaluated as having an acceptable quality.

In FIG. 4C the image 90 is centred and the regression angle 96 is 18.86. Thus, the image 90 is evaluated as having acceptable quality.

In FIG. 4D the image 90 is centred, and the regression angle 96 is 2.10. Thus, the image 90 is evaluated as having acceptable quality.

Figure 5:
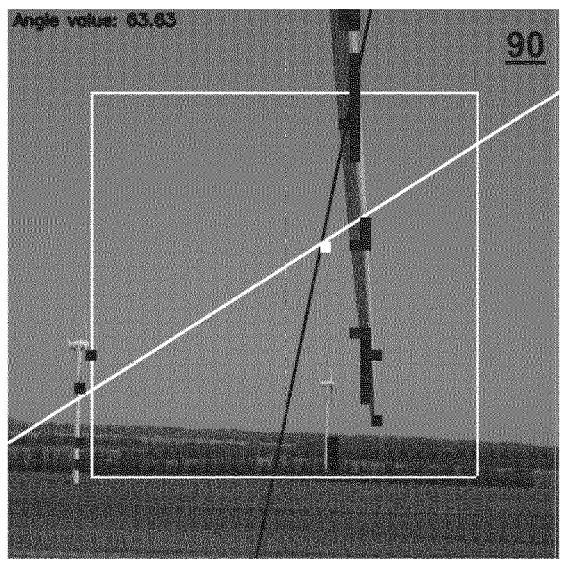
FIG. 5 illustrates four images which are deemed by the method to have a non-acceptable quality, wherein the images have an acceptable quality.
Figure 5:
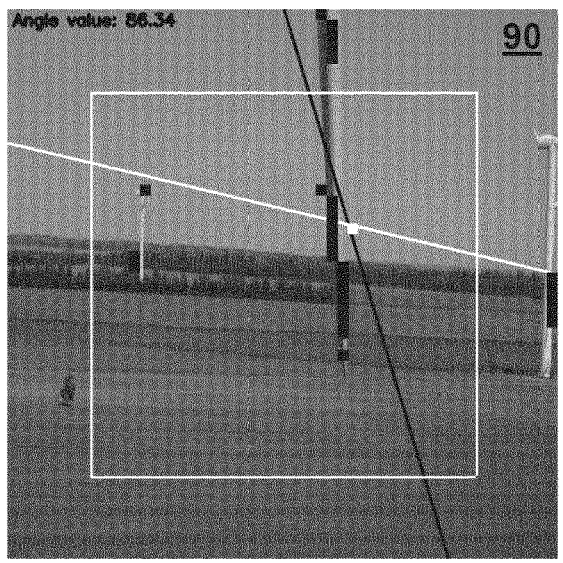
Figure 5:
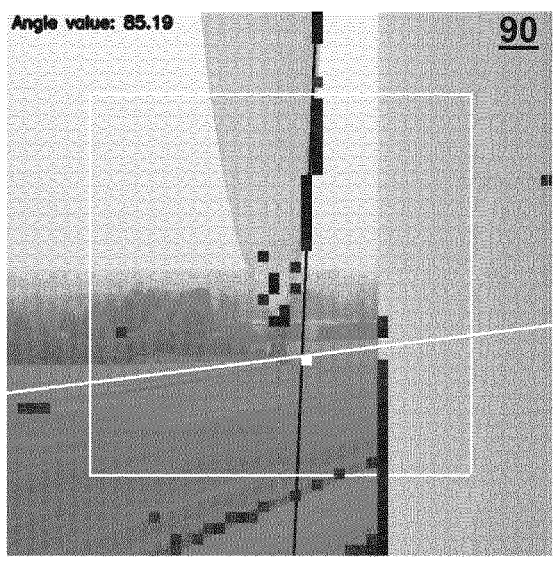
Figure 5:
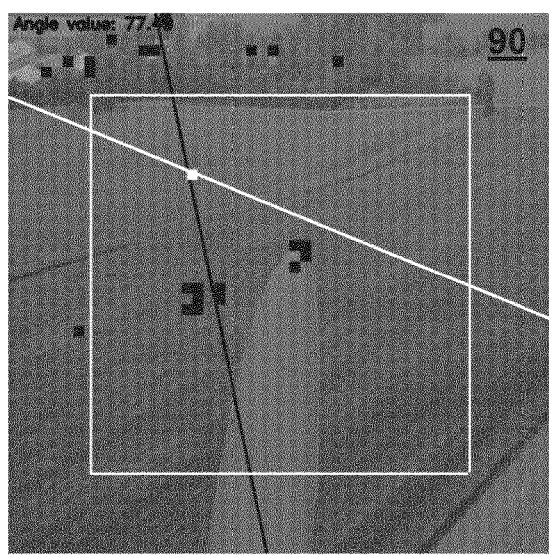

FIG. 5 illustrates four images 90 which are deemed by the method to have a non-acceptable quality, wherein the images 90 have an acceptable quality.

The threshold angle was in these evaluations 20 degrees, however other values can be used. All images 90 have according to the method a non-acceptable quality, however a decision maker will during further review evaluate the images 90 as having an acceptable quality. The examples show that often images of the tip of a blade are difficult to evaluate i.e. the rate of false negatives are high. However, the method 1000 greatly simplifies the work load and risk of non-acceptable image quality, since the tip of a blade is minor part of a wind turbine blade.

In FIG. 5A the image 90 is centred and the regression angle 96 is 63.63. Thus, the image 90 is evaluated as having a non-acceptable quality.

In FIG. 5B the image 90 is centred and the regression angle 96 is 86.34. Thus, the image 90 is evaluated as having a non-acceptable quality.

In FIG. 5C the image 90 is centred, and the regression angle 96 is 85.19. Thus, the image 90 is evaluated as having a non-acceptable quality.

In FIG. 5D the image 90 is centred and the regression angle 96 is 77.48. Thus, the image 90 is evaluated as having a non-acceptable quality.

Figure 6:
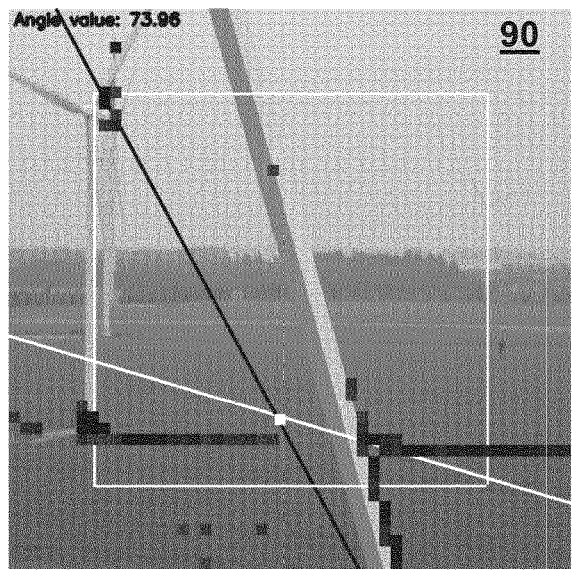
FIG. 6 illustrates three images which are deemed by the method to have a non-acceptable quality, wherein the images have a non-acceptable quality.
Figure 6:
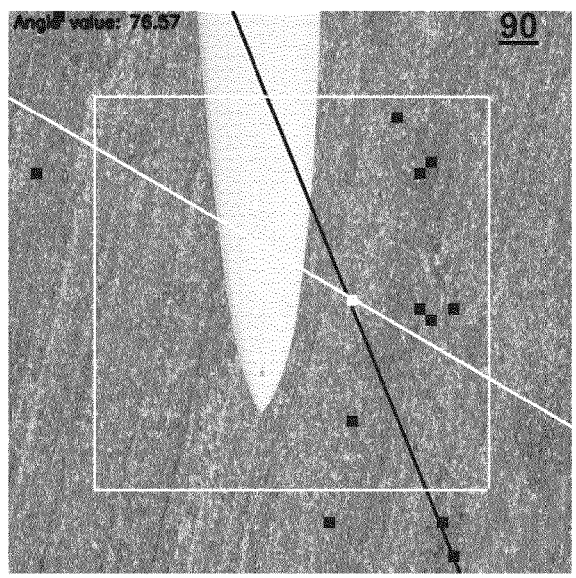
Figure 6:
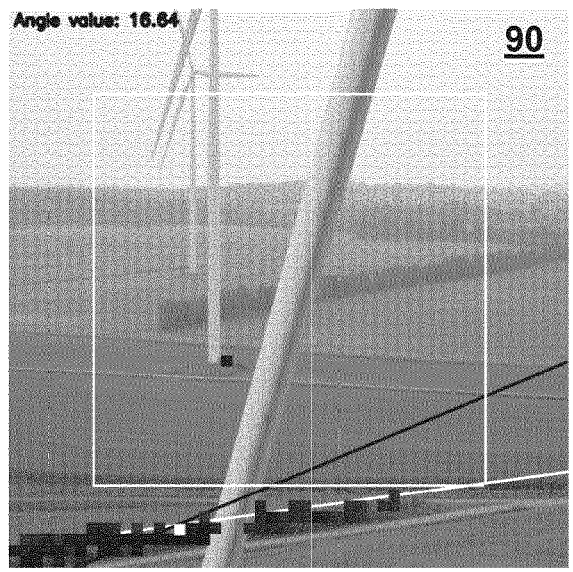

FIG. 6 illustrates three images 90 which are deemed by the method to have a non-acceptable quality, wherein the images 90 have a non-acceptable quality.

The threshold angle was in these evaluations 20 degrees, however other values can be used.

In FIG. 6A the image 90 is centred and the regression angle 96 is 75.96. Thus, the image 90 is evaluated as having a non-acceptable quality due to the regression angle.

Here the image 90 is clearly of non-acceptable quality as the blade is out of focus which will make it impossible to inspect the surface of the blade 50.

In FIG. 6B the image 90 is centred and the regression angle 96 is 76.57. Thus, the image 90 is evaluated as having a non-acceptable quality due to the regression angle.

The image 90 has a non-acceptable quality as the blade is out of focus and therefore the blade 50 is simply a completely white structure, which will make it impossible to inspect the surface of the blade 50.

In FIG. 6C the image 90 is not centred, and the regression angle 96 is 16.19. Thus, the image 90 is evaluated as having an acceptable quality due to the mean coordinate being out of the pre-set threshold border. Thus, by evaluating both the mean coordinate and the regression angle it is possible to lower the number of false positives.

Figure 7:
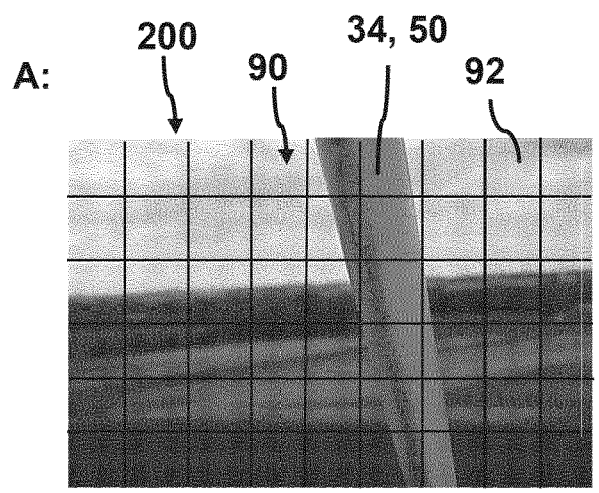
FIG. 7 illustrates cropping of an image based on an in-focus score.
Figure 7:
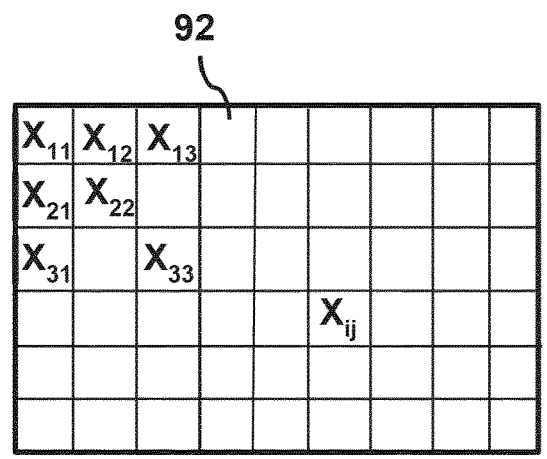
Figure 7:
Figure 7:
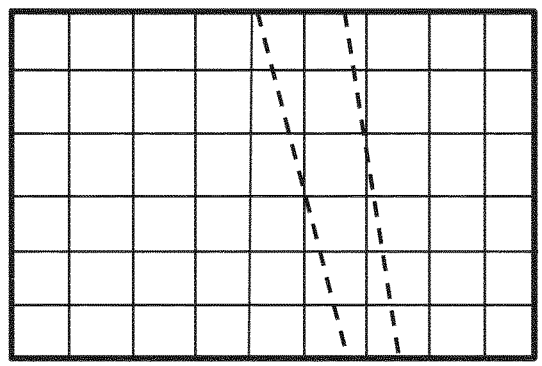
Figure 7:
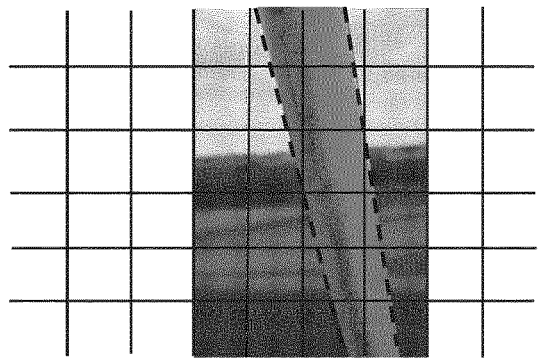
Figure 7:
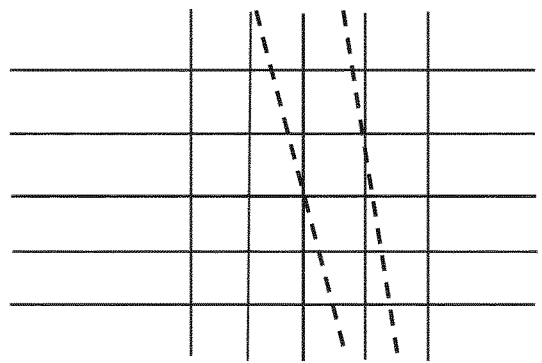

FIG. 7 illustrates cropping of an image 90 based on an in-focus score. The in-focus score is in this example the edge score 92 as described earlier.

For illustration purposes the image 90 is divided into only 56 sub-images 92, when in practice a 1000×1000 pixel may be divided into 2500 sub-images 92. As shown in FIG. 7A.

There may be an act of changing the image 90 to greyscale.

An act of calculating 300 edge scores ($X_{ij}$) of the sub-images 92 is then performed.

The act of calculating 300 edge scores may be by computing the Laplacian of the sub-images 92 and extracting the variance of each sub-image 92 as the edge score. A sub-image 92 where the pixels across the sub-image 92 go from white to black in a few pixels will have a high variance and thus a high edge score. In the shown image 90 the surface of the blade 50 has dark/black areas which would cause a high variance.

There may also be an act of calculating 300 an edge score on the image 90 by computing the Laplacian of the images 90 and extracting the variance of the image 90 as the edge score.

Thereby, an act of assigning an in-focus-score to each sub-image 92 is performed; and in this example the act of detecting in-focus sub-images as a function of the in-focus-score is performed by comparing the in-focus score of each sub-images 92 with the in-focus score of the image 90, wherein all sub-images 92 having a higher in-focus score than the image 90 is detected or tagged. This is illustrated in FIG. 7B.

Neighbouring sub-images to the detected or tagged sub-images 92 may also be tagged to ensure that too much information is not removed.

The detected or tagged sub-images 92 are saved, and the remaining sub-images 92 is cropped as shown in FIG. 7C.

The invention claimed is:

1. A computer-implemented method for on-site evaluating quality of an image of a part of a structure, optionally a part of a wind turbine generator, the method comprising acts of:
   receiving (100) an image from a visual inspection system with a field of view about a line of sight towards the part of the structure;
   dividing the image into sub-images;
   calculating edge scores of the sub-images;
   sorting the sub-images into a top sub-group having an edge-score above a pre-set edge score and a bottom sub-group having an edge-score below the pre-set edge score; —evaluating the quality of the image as a function of coordinates of the top sub-group by
   calculating a first linear regression of the top sub-group and second linear regression of the top sub-group, where the second linear regression has reversed the first and second axis relative to the first linear regression; and
   evaluating the quality of the image as a function of a regression angle between the first and second linear regression.

2. The method according to claim 1, wherein the structure is a wind turbine generator.

3. The method according to claim 1, wherein the act of calculating edge scores is by computing the Laplacian of the sub-images and extracting the variance of each sub-image as the edge score.

4. The method according to claim 1, wherein further acts of
   calculating a mean coordinate is performed on the top sub-group; and
   evaluating the quality of the image as a function of the mean coordinate relative to a pre-set threshold border within the image.

5. The method according to claim 1, wherein the method is performed on a group of images and an act of sorting the group of images is performed as a function of quality into at least two groups, including:
   an accepted image group; and
   a non-accepted image group.

6. The method according to claim 1, the method comprising further acts of
   geotagging the image as a function of position and line of sight of the visual inspection system.

7. The method according to claim 6, the method comprising further acts of
   sending instruction to the visual inspection system causing the visual inspection system to recapture at least one image having an unaccepted quality at one or more of a perturbed position and perturbed line of sight as a function of the geotag.

8. The method according to claim 1, the method comprising a further act of warning a decision maker as a function of one or more of the quality of an image and as function of the non-accepted image group relative to the accepted image group.

9. The method according to claim 1, wherein the visual inspection system has a fixed focus.

10. A device for on-site evaluating an image of a part of a structure, including a part of a wind turbine generator, the device being in communication with a visual inspection system with a field of view about a line of sight towards the wind turbine generator; and comprising the means for carrying out the method of claim 1.

11. The device according to claim 10, wherein the device further comprises
a display for manually evaluating images in the non-accepted image group.

12. The device according to claim 10, wherein the device is an unmanned aerial vehicle carrying the visual inspection system.

13. A non-transitory computer-readable medium comprising instructions stored thereon, the instructions executable by a computer, to cause the computer to carry out the method of claim 1.

* * * * *